United States Patent [19]

Hourticolon et al.

[11] Patent Number: 4,958,719
[45] Date of Patent: Sep. 25, 1990

[54] APPARATUS FOR SCRAPING SOLID MATERIALS FROM A CONVEYOR SURFACE

[75] Inventors: Roland Hourticolon, Leichlingen; Hermann Kloettschen, Duesseldorf, both of Fed. Rep. of Germany

[73] Assignee: Henkel Kommanditgesellschaft auf Aktien, Duesseldorf, Fed. Rep. of Germany

[21] Appl. No.: 237,267

[22] Filed: Aug. 26, 1988

[30] Foreign Application Priority Data

Aug. 27, 1987 [DE] Fed. Rep. of Germany ....... 3728580

[51] Int. Cl.⁵ .............................................. B65G 45/00
[52] U.S. Cl. ..................................... 198/635; 198/499
[58] Field of Search ....................... 198/497, 499, 635; 15/256.5

[56] References Cited

U.S. PATENT DOCUMENTS

| | | | |
|---|---|---|---|
| 3,952,863 | 4/1976 | Schattauer | 198/499 |
| 4,328,888 | 5/1982 | Luke | 198/499 |
| 4,529,084 | 7/1985 | Zhang | 198/499 |
| 4,696,389 | 9/1987 | Schwarze | 198/499 |

FOREIGN PATENT DOCUMENTS

| | | |
|---|---|---|
| 3624623 | 3/1987 | Fed. Rep. of Germany . |
| 3624754 | 1/1988 | Fed. Rep. of Germany . |
| 2143792 | 5/1985 | United Kingdom . |

Primary Examiner—Joseph J. Rolla
Assistant Examiner—Cheryl L. Gastineau
Attorney, Agent, or Firm—Ernest G. Szoke; Wayne C. Jaeschke; Real J. Grandmaison

[57] ABSTRACT

An apparatus for scraping solid materials from a conveyor belt comprising an elongate segmented scraper blade formed from a plurality of individual component blades which are aligned adjacent one another in a blade holder and which are supported to engage the conveyor belt under variable linear pressure, each component blade being adjustably attached by a flexible member to provide an elongate segmented scraping edge, the segments of which can independently and automatically flex to provide an elongate scraping edge which conforms to an irregular conveyor surface.

3 Claims, 2 Drawing Sheets

APPARATUS FOR SCRAPING SOLID MATERIALS FROM A CONVEYOR SURFACE

BACKGROUND OF THE INVENTION

1. Field of the Invention

This invention relates to an apparatus for scraping solid materials from a conveyor surface, comprising a scraper blade element formed by a plurality of component blades which are aligned adjacent one another in a blade holder and which are supported to be applied against the conveyor surface to scrape solid material therefrom.

2. Statement of Prior Art

West German Published Application DE-OS 36 24 623 discloses an apparatus in which all of the component blades are applied to a conveyor belt surface under uniform pressure over the entire width of the blade element by a very elaborate construction. This construction includes a blade holder in which a separate mounting element is provided for each component blade of the blade element, consisting of an expandable pressure member supplied from a pressure-medium source, a flexible intermediate link connected thereto, a lever and a flexible blade fastening member. Although this known arrangement guarantees that, even if individual component blades wear, the component blades are automatically readjusted within certain limits without any need for manual intervention, this function is only achieved by means of the very elaborate blade mounting assembly which, in most cases, is unduly expensive and impractical because the apparatus must be connected to a supply of pressure medium during operation.

In addition, the very complicated structure of this known apparatus makes assembly and, in particular, the replacement of individual blades very complicated. Another particular disadvantage of this known apparatus is that the conveyor belt has to be stopped and, hence, production interrupted to replace a single component blade.

Another apparatus of the present type is disclosed in West German Patent Publication DE-OS 36 24 754. The apparatus of this publication also comprises a blade element having adjustable component blades, the blades being adjustable purely mechanically with no external supply of pressure medium. However, this known apparatus also has a very complicated structure which makes assembly and, particularly, the replacement of individual blades very difficult. Also, as with the other known apparatus discussed above, it is not possible to replace individual blades while the conveyor belt is in motion because an individual component blade can only be replaced after a support arm connected to a blade holder has been disconnected by complicated loosening of fastening bolts and corresponding lock nuts.

BRIEF DESCRIPTION OF THE INVENTION

The present invention relates to an improved apparatus of the aforementioned type which is much easier to handle and, in particular, enables component blades to be replaced without the conveyor belt having to be stopped. This is achieved by a novel design in which at least one adjustable compression means is provided for each component blade in the blade holder, acting directly on each individual component blade, preferably through a flexible intermediate member.

Each individual component blade of the blade element is held in the blade holder by its own adjustable compression means, such as a pressure screw and flexible intermediate member, so that a component blade can be replaced, even when the conveyor belt is moving, merely by the operator manually loosening the pressure screw and simply removing and replacing the blade with a new blade which is then fixed in the blade holder by retightening of the pressure screw. Since each pressure screw acts directly on the particular individual component blade through a corresponding flexible intermediate member satisfactory operation of the apparatus is provided Through the variable screw-in length of the pressure screw, each individual component blade may be pressed onto the conveyor belt under the particular linear pressure required.

According to one embodiment of the present invention, the flexible intermediate member is a helical spring and the pressure screw is in the form of a tommy screw. Such a helical spring is a preferred flexible or compressible intermediate element, although other equivalent members can also be used. The use of a tommy screw provides for particularly simple blade adjustment or replacement without any need for tools.

According to one particularly practical embodiment of the present invention, an edge is formed in the blade holder for the rotatable mounting of the component blades. An optimal scraping position of each individual component blade relative to the conveyor belt can be obtained particularly simply in this way in association with the adjustment of the blades by the pressure screw and the flexible intermediate element.

DETAILED DESCRIPTION OF THE INVENTION

Figure 1:
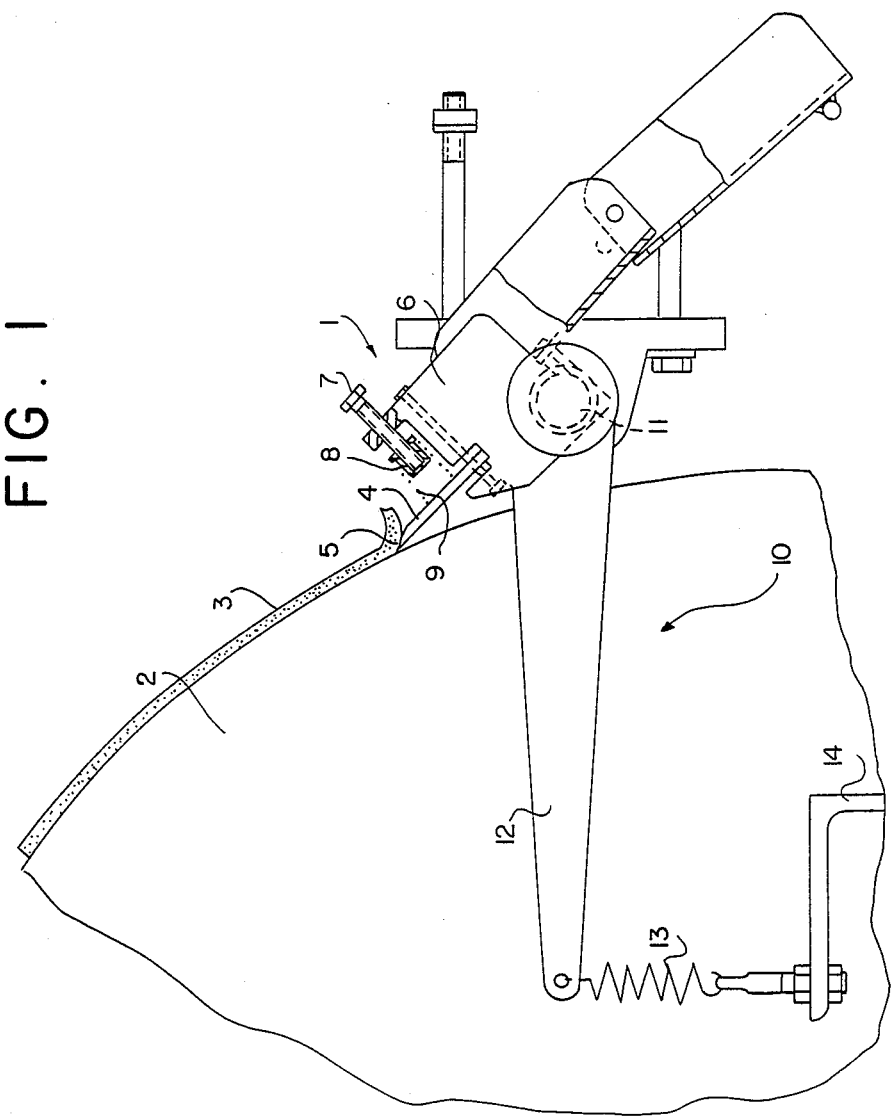
FIG. 1 is a diagrammatic side view of an apparatus according to the present invention, illustrated in operating position in association with a guide roller.
Figures 2, 3:
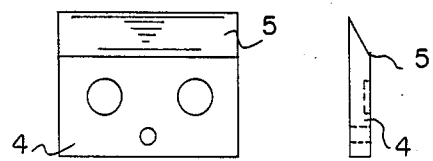
FIG. 2 is a plan view of an individual blade, an aligned plurality of which are used as the blade element of the apparatus of FIG. 1.
FIG. 3 is an edge view of the blade of FIG. 2.
Figure 4:
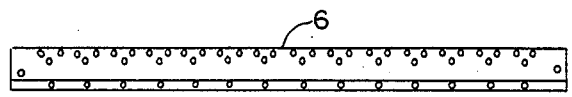
FIG. 4 is a plan view of the holder for the plurality of aligned blades in the apparatus of FIG. 1.
Figure 5:
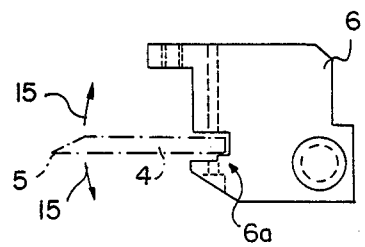
FIG. 5 is a side elevation view of the blade holder of FIG. 4.

FIG. 1 of the drawings illustrates a scraping unit 1 for scraping a solid material 3 from a surface on a guide roller 2, comprising a blade holder 6 adjustably supporting a plurality of component blades 4 each having a scraping or cutting edge 5. An edge 6a is formed in the blade holder member 6 for the rotatable or pivot mounting (arrow 15, FIG. 5) of the component blades 4. Each individual component blade 4 is adjustably secured by a pressure screw 7, more especially a tommy screw, which is designed to act on the component blade 4 through a take-up bushing 8 and a compressible helical spring 9. It is also possible to provide two pressure screws 7 and, correspondingly, two take-up bushings 8 and helical springs 9 for each component blade 4.

The blade holder member 6, including the aligned component blades 4 supported therein, is mounted on a fixed shaft for rotation thereon and is biased by a tensioning element 10 which comprises a fixed connection 11 to the blade holder 6, a tensioning lever 12, a tension spring 13 and a fastening element 14.

In operation, the unit 1 is used to scrape removable solid material 3 from the guide roller 2 or other moving belt or surface To this end, the component blades 4 are inserted adjacent one another into the blade holder 6, the component blades 4 being fixed by the edge 6a of the holder 6 and the pressure elements 7, 8 and 9. As in known scraping units, the blade holder 6 is then fastened to the roller 2 by means of the tensioning element 10. Biassing of the blades 4 via the blade holder 6 is effected by the tensioning element 10 through the adjustment of the tensioning lever 12 and the tension spring 13.

In this condition, all the component blades 4 have the same bias. To adapt or conform the blade edges 5 to the surface of the roller 2, each of the component blades 4 can be individually adjusted This adjustment is effected through the pressure screws 7 and the helical springs 9, the effect of the pressure being to turn the particular component blade 4 correspondingly about the edge 6a of the blade holder. It is of particular advantage in this regard that the adjustment of any given component blade 4 does not affect the contact pressure of the adjacent blades. The component blades 4 are aligned adjacent one another in the blade holder 6 in such a way that no gap is left between the individual cutting edges 5 of the blades 4, so that scraping takes place over the entire width of the guide roller 2.

The helical springs 9 provide for elastic or flexible mounting of the component blades 4 so that no damage is done to the component blades 4 in the event of sudden changes in the interval between any cutting edge 5 and the surface of the guide roller 2. Since each component blade 4 can be individually adjusted to adapt or conform the linear cutting edge to the particular surface of the guide roller 2, different loads or pressures are not applied along the elongate cutting edge consisting of the individual blade cutting edges 5. In addition, the component blades 4 require virtually no readjustment after initial adjustment, i e , maintenance is considerably reduced.

If one of the component blades 4 has to be replaced, the blade 4 in question may be removed, even while the guide roller 2 is rotating, simply by manually loosening the corresponding pressure screw 7 replacing the worn blade with a new blade, and then retightening the pressure screw 7.

According to another embodiment two rows of aligned blades 4 may be arranged, one behind the other and offset from one another in two planes, to form an overlap between the blade edges of each row, both of which are aligned to engage the surface to ensure complete removal of the solid material 3 from the guide roller 2 over the entire width thereof.

The invention is by no means confined to the example of embodiment shown in the drawing Other embodiments are possible without exceeding the scope of the claims. Thus, instead of helical springs, other elastic or flexible intermediate elements, such as leaf springs, pneumatic cylinders, etc., may be used between the pressure screw and the component blade. It is also possible under certain in-use conditions to allow the pressure screws to act directly on the component blades without the need for flexible intermediate elements. However, flexible elements are preferred in that they permit each of the blades to flex away from the conveyor surface, during operation thereof, to provide an elongate segmented blade edge which continuously and automatically adjusts to conform to an irregular conveyor surface.

It is to be understood that the above described embodiments of the invention are illustrative only and that modifications throughout may occur to those skilled in the art.

We claim:

1. An apparatus for scraping removable solid materials from a wide conveyor surface, comprising an elongate blade holder member, a plurality of individual blades having scraping edges, means for engaging said blades in alignment within said holder member to provide a segmented elongate scraping blade edge for engagement with the wide conveyor surface, said blade holder member having an edge formed therein to enable rotatably or pivotally engaging the individual blades therewithin, and individual adjustable compression means attached to said blade holder member for adjustably fastening the individual blades within the blade holder member in a rotated or pivoted position and provide an elongate segmented blade edge, said adjustable compression means comprising at least one adjustable screw and flexible member for each of the individual blades, each said screw threadably engaging the blade holder member and with the flexible member applying a compressive force against a said individual blade to fasten said blade within the holder, whereby the blade edge segments are individually and independently adjustable to conform to conveyor surface irregularities.

2. An apparatus according to claim 1 which includes tensioning means for fastening the blade holder member in association with a conveyor surface support so that the elongate scraping blade edge is biased against the conveyor surface.

3. An apparatus according to claim 1 in which each said adjustable screw is a tommy screw and each said flexible member is a spring.

* * * * *